United States Patent
Takahashi

(10) Patent No.: US 6,840,211 B2
(45) Date of Patent: Jan. 11, 2005

(54) DIESEL ENGINE

(75) Inventor: Susumu Takahashi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/721,108

(22) Filed: Nov. 25, 2003

(65) Prior Publication Data

US 2004/0103874 A1 Jun. 3, 2004

(30) Foreign Application Priority Data

Nov. 26, 2002 (JP) ........................................ 2002-342254

(51) Int. Cl.[7] .............................................. F02B 3/00
(52) U.S. Cl. ...................................... 123/299; 123/300
(58) Field of Search ................................ 123/299, 300, 123/305, 295, 430, 478, 480

(56) References Cited

U.S. PATENT DOCUMENTS

| | | | | |
|---|---|---|---|---|
| 4,621,599 A | * | 11/1986 | Igashira et al. | 123/300 |
| 5,165,373 A | * | 11/1992 | Cheng | 123/300 |
| 6,378,487 B1 | * | 4/2002 | Zukouski et al. | 123/299 |
| 6,470,849 B1 | * | 10/2002 | Duffy et al. | 123/299 |
| 6,491,016 B1 | * | 12/2002 | Buratti | 123/299 |
| 6,732,705 B2 | * | 5/2004 | Ebelsheiser et al. | 123/299 |

FOREIGN PATENT DOCUMENTS

| | | |
|---|---|---|
| JP | 2000-008929 | 1/2000 |
| JP | 2000-110646 | 4/2000 |
| JP | 2000-161110 | 6/2000 |
| JP | 2001-041089 | 2/2001 |

* cited by examiner

*Primary Examiner*—Mahmoud Gimie
(74) *Attorney, Agent, or Firm*—McCormick, Paulding & Huber LLP

(57) ABSTRACT

In the diesel engine of the present invention, an early-stage injection (A) is performed so that this injection is divided into a plurality of injections during the compression stroke of the engine, and a main injection (B) is performed following the completion of this early-stage injection. Furthermore, the early-stage injection is performed using an amount of fuel and timing which are such that the generation of heat caused by fuel of the early-stage injection occurs in the vicinity of compression top dead center, and the main injection is performed using an amount of fuel and timing which are such that the generation of heat caused by fuel of the main injection occurs after the generation of heat caused by fuel of the early-stage injection has been completed. Since the early-stage injection is divided into a plurality of injections, the adhesion of fuel to the inside walls of the cylinder is prevented, and pre-mixing of the fuel is promoted. Since the generation of heat caused by fuel of the main injection occurs after the generation of heat caused by fuel of the early-stage injection has been completed, there is no sudden entry of fuel injected by the main injection into the hot flame inside the cylinder; accordingly, the aggravation of smoke is prevented.

5 Claims, 5 Drawing Sheets

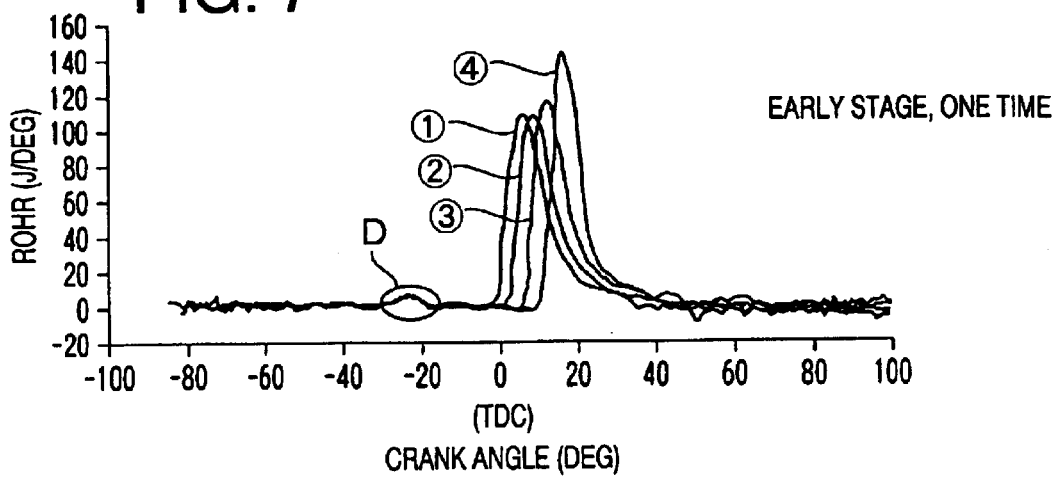
FIG. 7 EARLY STAGE, ONE TIME
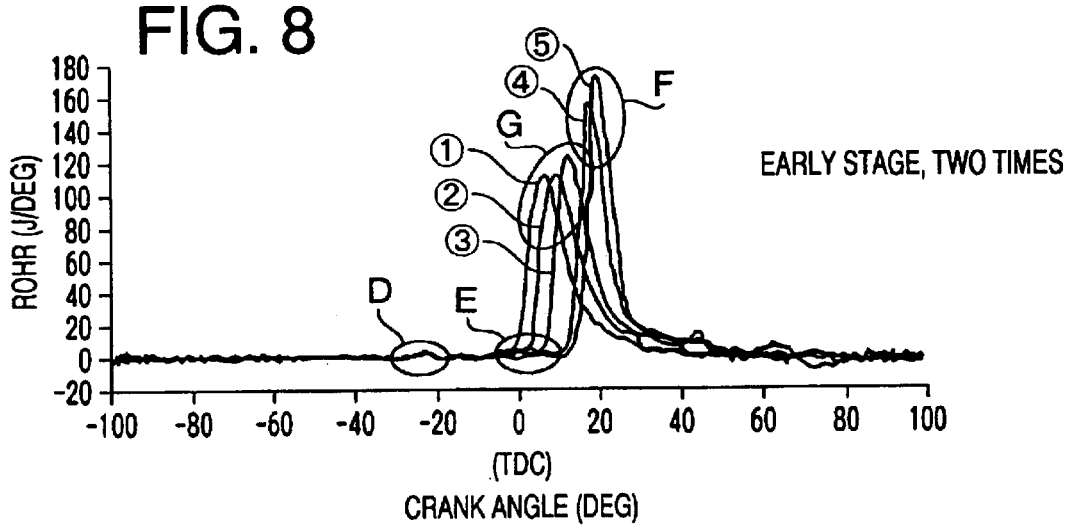
FIG. 8 EARLY STAGE, TWO TIMES
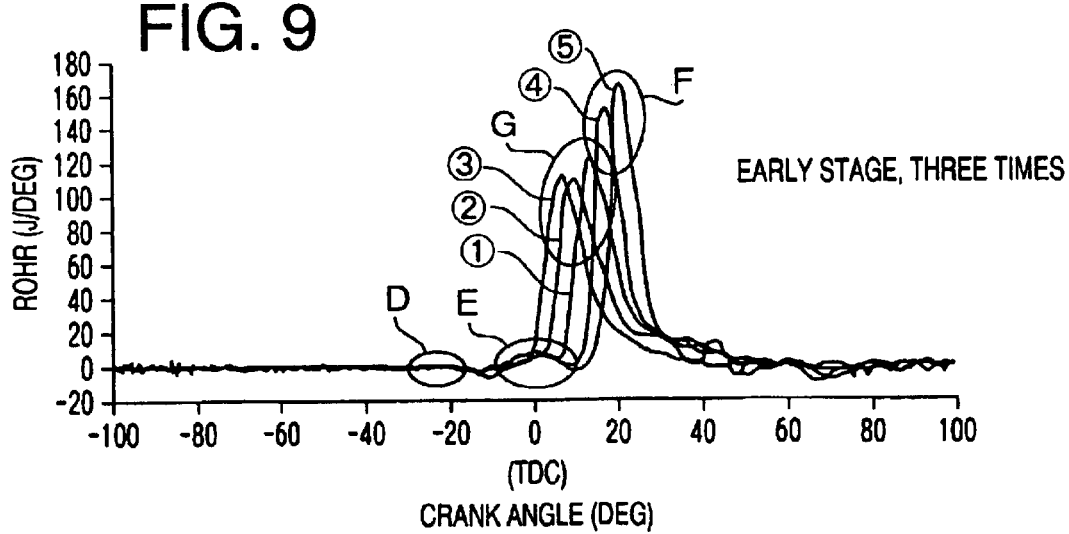
FIG. 9 EARLY STAGE, THREE TIMES

DIESEL ENGINE

CROSS REFERENCE TO RELATED APPLICATION

Applicants hereby claims foreign priority benefits under U.S.C. § 119 of Japanese Patent Application No. 2002-342254, filed on Nov. 26, 2002, and the content of which is herein incorporated by reference.

BACKGROUND OF THE INVENTION

1. Field of the Invention

The present invention relates to a diesel engine, and more particularly to a diesel engine in which an early-stage injection that is performed at an earlier stage than normal pilot injection, and a main injection that is performed thereafter.

2. Description of the Related Art

Conventionally, in diesel engines, it is known that a pilot injection and a main injection are performed. In such engines, a relatively small amount of pilot injection is first performed at a timing in the vicinity of compression top dead center (generally, around 10° BTDC to 10° ATDC), and a relatively large amount of main injection is performed immediately after this pilot injection. The fuel provided by the pilot injection is ignited immediately following injection; this acts as a flame seed that aids the ignition of the main injection. Since the ignition lag of the fuel injected in the main injections is suppressed, and rapid early-stage combustion and an abrupt increase in the pressure inside the cylinder are suppressed, vibration noise is suppressed.

However, in this pilot and main injection, since the main-injection fuel suddenly enters the combustion chamber in which combustion caused by the pilot injection, the drawback of smoke generation is encountered. Furthermore, the drawback of the generation of NOx by the combustion of the pilot-injection fuel is also encountered. Since there is a flame seed created by the pilot injection, the problem of an aggravation of NOx due to the combustion of the main-injection fuel does not arise.

In recent years, meanwhile, in order to achieve a simultaneous reduction in smoke and NOx, uniform pre-mixed combustion has been proposed in which fuel injection is performed using a timing (in concrete terms, during the compression stroke before pilot injection) and amount which are such that ignition does not occur immediately following fuel injection, a pre-mixture is formed inside the cylinder, and this pre-mixture is ignited in the vicinity of compression top dead center. In this combustion method, fuel injection is generally performed once, without being divided into pilot and main injection.

However, in this combustion method, since fuel injection is performed in a state in which the interior of the cylinder is at a low pressure and the air density is low, i.e., during the transition from the intake stroke to the compression stroke, the penetration of the fuel jet mist is relatively strong, so that the fuel jet mist directly collides with and adheres to the inside walls of the cylinder. As a result, problems such as the exhaust of unburned fuel (HC), an aggravation of CO accompanying incomplete combustion and the like arise. Furthermore, in cases where it is attempted to create a completely uniform pre-mixture inside the cylinder, it is desirable to perform fuel injection at as early a stage as possible, e.g., during the intake stroke; if this is done, however, it becomes difficult to cause auto-ignition of the pre-mixture at the desired timing, so that the combustion period tends to become unstable.

Accordingly, in recent years, a combustion method has been proposed in which such pre-mixture combustion is divided into two injections, i.e., an early-stage injection and a main injection, a pre-mixture is formed by the early-stage injection during the compression stroke, the main injection is performed in the vicinity of compression top dead center, and the ignition period is thus controlled.

Even in this case, however, various problems such as the problem of adhesion of the fuel injected by the early-stage injection to the inside walls of the cylinder, an increase in the internal temperature of the cylinder by the fuel injected in the early-stage injection and the like arise; accordingly, it is difficult to effect favorable combustion without a deterioration in the exhaust gas. In the case of a single early-stage injection, it is difficult to cause uniform mixing of the fuel jet mist and air in the time before compression top dead center is reached, so that a region where the fuel is concentrated (rich) remains inside the cylinder, thus causing an oxidation reaction of the fuel to occur in the stage before compression top dead center is reached; this leads to a rise in the temperature of the combustion chamber, and also caused a deterioration in the fuel economy. Furthermore, in cases where the main injection is performed in the vicinity of compression top dead center following this early-stage injection, the main-injection fuel is burned at once, so that the problem of NOx is aggravated. It is also conceivable that the main injection timing might be retarded in order to avoid NOx; if this is done, however, there is an aggravation of HC and CO. Accordingly, in the case of a pre-mixture combustion method using this early-stage injection and main injection, it is difficult to obtain the intrinsic merits of pre-mixed combustion.

SUMMARY OF THE INVENTION

Accordingly, the present invention was devised in light of the above problems, and it is an advantage of the present invention to realize favorable combustion without any aggravation of the exhaust gas or fuel consumption by preventing problems such as adhesion of the fuel jet mist to the inside walls of the cylinder and the like in cases where pre-mixed combustion based on an early-stage injection and a main injection is realized.

The present invention provides a diesel engine comprising a fuel injector which injects fuel into a cylinder, and fuel injection control means for controlling the amount of fuel that is injected from this fuel injector and the liming of this fuel injection, wherein the abovementioned fuel injection control means performs an early-stage injection of a relatively small amount of fuel divided into a plurality of injections in the compression stroke, and performs a main injection of a relatively large amount of fuel after a specified period has elapsed following the completion of the early-stage injection, the abovementioned early-stage injection is performed using a fuel injection amount and fuel injection timing which are such that the generation of heat caused by fuel of the early-stage injection occurs in the vicinity of compression top dead center, and the abovementioned main injection is performed using a fuel injection amount and fuel injection timing which are such that the generation of heat caused by fuel of the main injection occurs after the generation of heat caused by fuel of the early-stage injection has been completed.

Preferably, the abovementioned fuel injection control means perform the initial injection of the abovementioned early-stage injection at a timing after 80° BTDC and before 40° BTDC.

Preferably, furthermore, the abovementioned fuel injection control means performs the abovementioned main injection after compression top dead center.

Furthermore, the present invention provides a fuel injection method for a diesel engine, wherein the early-stage injection of a relative small amount of fuel is performed with this injection divided into a plurality of injections during the compression stroke of the engine, the main injection of a relatively large amount of fuel is performed after a specified period has elapsed following the completion of the early-stage injection, the abovementioned early-stage injection is performed using a fuel injection amount and fuel injection timing which are such that the generation of heat caused by fuel of the abovementioned early-stage injection occurs in the vicinity of compression top dead center, and the abovementioned main injection is performed using a fuel injection amount and fuel injection timing which are such that the generation of heat caused by fuel of the main injection occurs after the generation of heat caused by fuel of the early-stage injection has been completed.

In the present invention, since the early-stage injection is performed with this injection divided into a plurality of injections, the penetration of the fuel jet mist in each injection is weakened, so that the adhesion of fuel to the inside walls of the cylinder is prevented. Furthermore, pre-mixing of the fuel injected in the early-stage injection is promoted, so that an aggravation of CO, HC and fuel consumption is suppressed. The generation of heat based on the pre-mixture formed by the fuel injected in the early-stage injection occurs in the vicinity of compression top dead center. Since the fuel injection amount and fuel injection timing of the main injection that is performed following the early-stage injection are set at values which are such that the generation of heat caused by fuel of the main injection occurs after the generation of heat caused by fuel of the early-stage injection has been completed, there is no sudden entry of the fuel jet mist created by the main injection into the hot flame inside the cylinder, so that mixing of the fuel and air is sufficiently achieved, thus preventing an aggravation of smoke.

BRIEF DESCRIPTION OF THE DRAWINGS

FIG. 7 shows the results of a test investigating the conditions of heat generation inside the cylinder caused by fuel injection, and shows an example in which a single early-stage injection and a main injection were performed;

FIG. 8 shows the results of a test investigating the conditions of heat generation inside the cylinder caused by fuel injection, and shows an example in which two early-stage injections and a main injection were performed; and FIG. 9 shows the results of a test investigating the conditions of heat generation inside the cylinder caused by fuel injection, and shows an example in which three early-stage injections and a main injection were performed.

DESCRIPTION OF THE PREFERRED EMBODIMENTS

A preferred embodiment of the present invention will be described below with reference to the attached figures.

Figure 1:
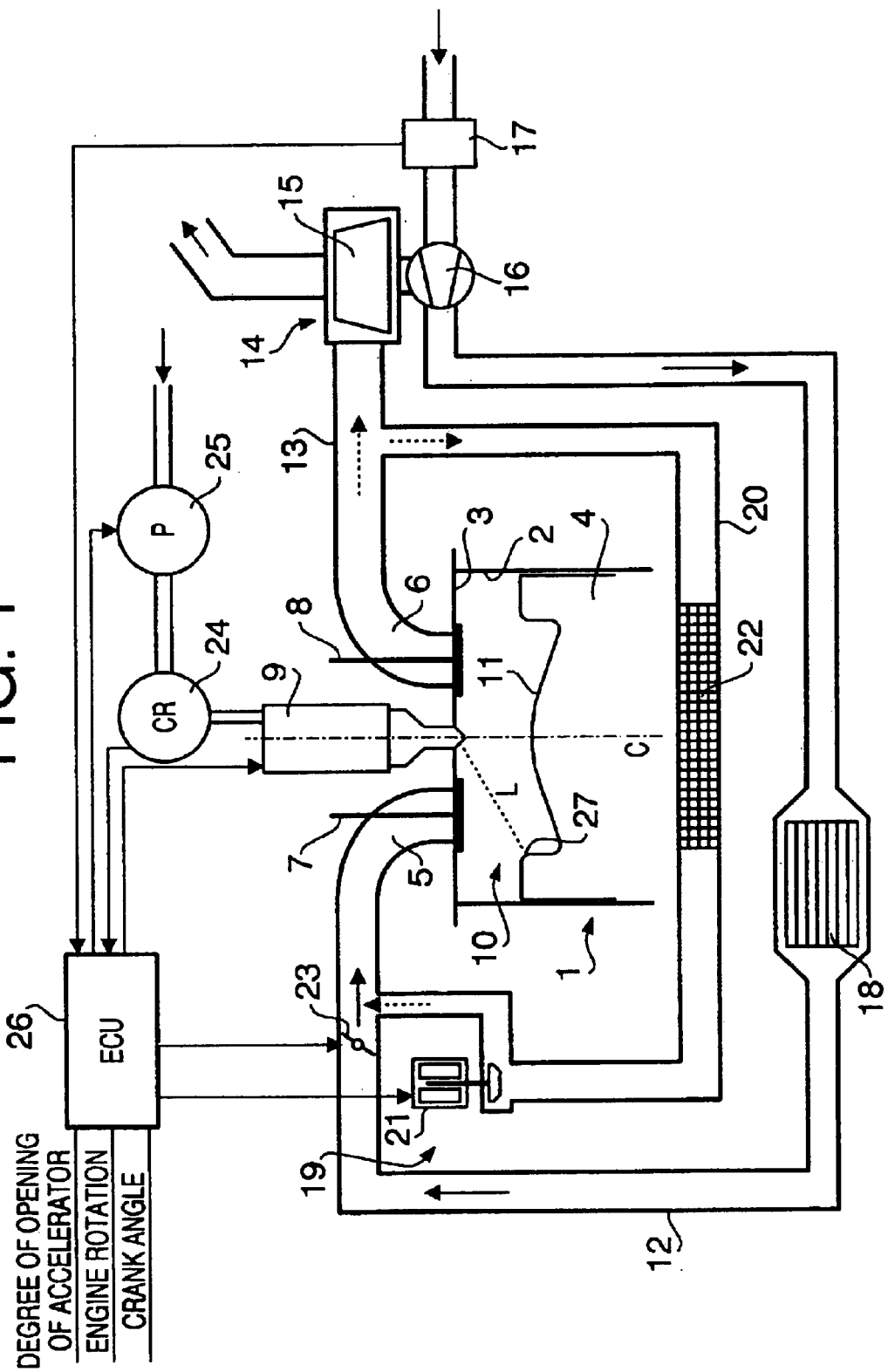
FIG. 1 is a structural diagram which shows a diesel engine constituting an embodiment of the present invention.

FIG. 1 shows a diesel engine constituting the present embodiment. This engine is a direct-injection diesel engine for use in vehicles, and comprises a common rail fuel injection control device as fuel injection control means. For convenience, only a single cylinder is shown in the figures; however, this engine may also naturally be a multi-cylinder engine.

1 indicates the engine main body; this is constructed from a cylinder 2, cylinder head 3, piston 4, intake port 5, exhaust port 6, intake valve 7, exhaust vale 8, injector 9 (used as a fuel injector) and the like. A combustion chamber 10 is formed inside the cylinder 2, and fuel is directly injected into the combustion chamber 10 from the injector 9. A cavity 11 is formed in the top part of the piston 4, and this cavity 11 forms a part of the combustion chamber 10. The cavity 11 forms the configuration of a re-entrant type combustion chamber in which the center of the bottom part protrudes. The injector 9 is positioned substantially coaxially with the cylinder 2, and fuel is simultaneously injected in a radial pattern from a plurality of jet holes. The angle formed by the axial lines L of the respective fuel jet mists and the center C of the cylinder is always constant.

The intake port 5 is connected to an intake pipe 12, and the exhaust port 6 is connected to an exhaust pipe 13. Furthermore, a turbo-charger 14 is installed in this engine, so that the intake is supercharged utilizing the exhaust energy. 15 indicates a turbine, and 16 indicates a compressor. An intake air amount sensor 17 which is used to detect the amount of intake air is installed on the upstream side of the compressor 16, and an inter-cooler 18 which is used to cool the intake air is installed on the downstream side of the compressor 16. Furthermore, the present invention can also be applied to a natural intake engine that does not have a turbo-charger.

An EGR (Exhaust Gas Recirulation) device 19 is also installed in this engine. The EGR device 19 comprises an EGR pipe 20 that connects the intake pipe 12 and the exhaust pipe 13, an EGR valve 21 which is used to regulate the amount of EGR, and an EGR cooler 22 which cools the EGR gas on the upstream side of the EGR valve 21. An intake throttle valve 23 which is used to appropriately throttle the intake air on the upstream side of the connecting part with the EGR pipe 20 is installed in the intake pipe 12.

The injector 9 is connected to a common rail 24, and high-pressure fuel (20 to 200 MPa) corresponding to the injection pressure that is accumulated and pressurized in this common rail 24 is constantly supplied to the injector 9. The pressure feeding of fuel to the common rail 24 is accomplished by means of a supply pump 25.

An electronic control unit (hereafter referred to as an "ECU") 26 is provided for the electronic control of this engine. The ECU 26 detects the actual engine operating conditions from various types of sensors, and controls the injector 9, EGR valve 21, intake throttle valve 23, an amount regulating valve (not shown in the figures) that regulates the amount of fuel that is pressure-fed from the high-pressure supply pump 25 and the like on the basis of these engine operating conditions. In addition to the abovementioned intake air amount sensor 17, the abovementioned sensors include an accelerator degree-of-opening sensor, an engine rotation sensor, a common rail pressure sensor and the like (none of which is shown in the figures), so that the actual amount of intake air, degree of opening of the accelerator, engine rotational speed (rpm), engine crank angle, common rail pressure (fuel pressure inside the common rail 24) and the like are detected by the ECU 26.

The ECU 26 determines the target common rail pressure in accordance with the operating conditions of the engine, and performs feedback control of the common rail pressure so that the actual common rail pressure approaches the target common rail pressure.

Furthermore, the injector 9 has an electromagnetic solenoid as an electrical actuator that is switched on and off by the ECU 26. When the electromagnetic solenoid is "on", the resulting state is an open state so that fuel is injected; furthermore, when the electromagnetic solenoid is "off", the resulting state is a closed state so that fuel injection is stopped. The ECU 26 determines the target fuel injection amount and target fuel injection timing in accordance with a predetermined map on the basis of the actual engine operating conditions (primarily the engine rotational speed and degree of opening of the accelerator), and switches the electromagnetic solenoid "on" for a specified period in accordance with the target fuel injection amount when this timing actually arrives. If the common rail pressure is constant, the "on" time increases with an increase in the target fuel injection amount.

Next, the fuel injection method used in the engine of the present embodiment will be described.

Overall, the fuel injection comprises an early-stage injection of a relatively small amount of fuel, and a main injection of a relatively large amount of fuel that is performed after a specified period has elapsed following the completion of this early-stage injection. The early-stage injection is performed at a timing that is earlier than the timing (10° BTDC to 10° ATDC) of the pilot injection described above. Especially in the case of the present invention, the early-stage injection is divided into a plurality of injections, i.e., two or more injections. Furthermore, the term "fuel injection timing" refers to the timing at which actual fuel injection is initiated, i.e., the time at which fuel actually begins to leave the jet ports of the injector. In the case of a plurality of early-stage injections, this refers to the timing at which the initial fuel injection is initiated.

Figure 2:
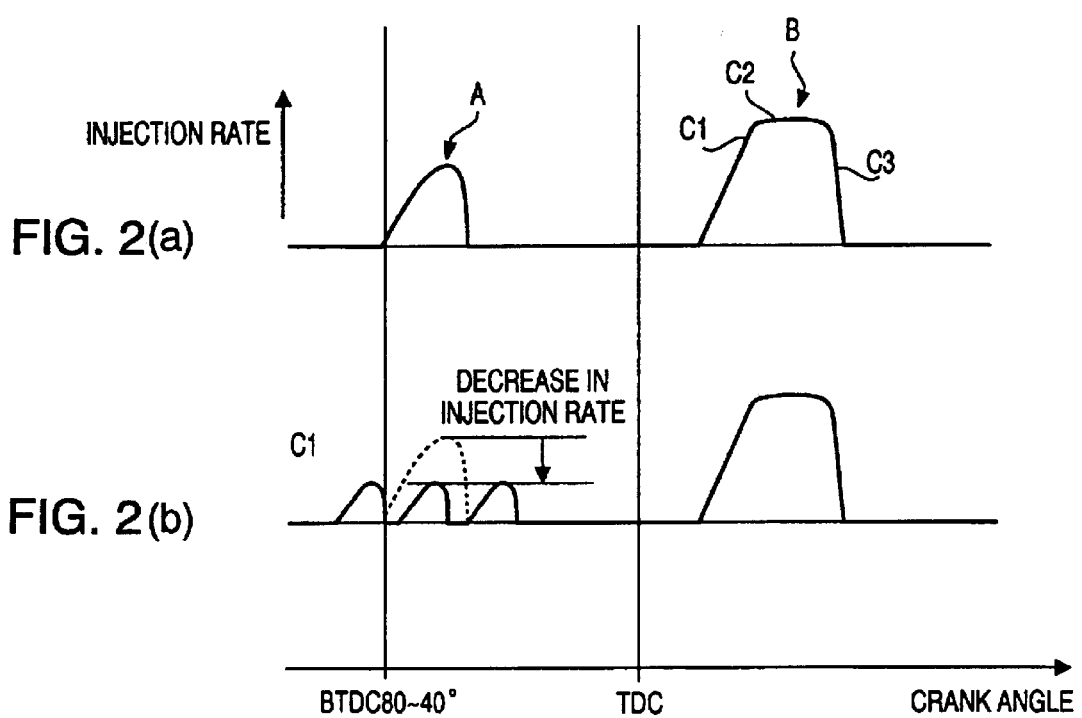
FIG. 2a shows the conventional fuel injection patterns in the case of the early-stage injection and main injection, FIG. 2b the fuel injection patterns according to the present invention in the case of the early-stage injection and main injection.

FIG. 2 shows the fuel injection patterns used when the abovementioned early-stage injection and main injection are performed. The horizontal axis indicates the crank angle, and the vertical axis indicates the actual injection rate. FIG. 2a shows conventional fuel injection patterns, in which an early-stage injection is performed only one time. FIG. 2b shows the fuel injection patterns used in the present invention, in which the abovementioned early-stage injection is performed a plurality of times, i.e., two or more times. In the example shown in the figures, this early-stage injection is performed three times, and a short non-injection period is interposed between the respective injections.

Conventionally, as is shown in FIG. 2a, an early-stage injection A of a relatively small amount of fuel is performed at a timing earlier than the ordinary pilot injection that is performed after 80° before compression top dead center and before 40° before compression top dead center (this is referred to as "80 to 40° BTDC"), and a main injection B of a relatively large amount of fuel is then performed at a timing in the vicinity of compression top dead center (TDC) (after TDC in the example shown in the figures).

In the present embodiment, on the other hand, as is shown in FIG. 2b, the early-stage injection A is performed with this injection divided into a plurality of injections. Furthermore, in the present embodiment, the main injection B is performed using the same fuel injection amount and fuel injection timing as in a conventional method. In regard to the early-stage injection, the total fuel injection amount is the same as in a conventional method, and the initial fuel injection timing is advanced compared to that used in a conventional method, so that the fuel injection timing is a timing that is substantially comparable to that used in a conventional method.

At the timing of the early-stage injection A shown in FIGS. 2a and 2b, the piston is still rising, and is lower than compression top dead center; furthermore, the interior of the cylinder is at a low pressure, and the air density is low. When a conventional early-stage injection A such as that shown in FIG. 2a is performed in such a state, since the injection rate is high, the penetration of the fuel jet mist is excessively strong in relative terms, thus creating problems such as the adhesion of the fuel jet mist to the inside walls of the cylinder, accompanying exhaust of HC and CO and the like. In the present embodiment shown in FIG. 2b, on the other hand, the injection rates of the respective injections performed in the early-stage injection A can be kept at low values. As a result, the abovementioned problems can be eliminated. Furthermore, the object of this early-stage injection is pre-mixing of the fuel; here, performing the early-state injection a plurality of times with a small amount of fuel being injected each time as in the present embodiment is more advantageous for dispersion of the fuel into the cylinder and uniform pre-mixing of the fuel in a short time than a system in which a large amount of early-stage injection is performed at one time as in conventional methods.

Generally, in the case of a common rail system, for structural reasons, the waveform of the injection rate when a sufficient amount of fuel is injected is a waveform in which the injection rate gradually rises (C1) for a specified period in the initial stage of injection, after which a constant injection rate is maintained (C2), and the injection rate abruptly drops (C3) when injection is completed (as indicated by the waveform of the main injection B). Accordingly, if the early-stage injection A is divided into a plurality of injections as in the present embodiment shown in FIG. 2b, injection can be performed only in the portion (C1) where the injection rate in the initial stage of injection rises. As a result, the penetration of the fuel jet mist is weakened, so that the distance traveled by the jet mist is shortened, thus making it possible to prevent the adhesion of fuel to the inside walls of the cylinder.

Next, the results of exhaust gas tests performed in cases where the fuel injection pattern was varied will be described with reference to FIGS. 3 through 6.

In the graphs shown in FIGS. 3 through 6, the value obtained by dividing the amount of NOx exhaust by the output power is shown on the horizontal axis. The vertical axis indicates the amount of HC exhaust in FIG. 3, the amount of CO exhaust in FIG. 4, the fuel consumption (SFC) in FIG. 5, and the amount of smoke exhaust in FIG. 6.

In the respective graphs, the curves (2) through (4) indicate the results obtained in cases where an early-stage injection and main injection such as those shown in FIGS.

2*a* and 2*b* were performed. (2) indicates cases where an early-stage injection was performed only one time (corresponding to FIG. 2*a*). (3) indicates cases where an early-stage injection was performed with this injection divided into two injections, and (4) indicates cases where an early-stage injection was performed with this injection divided into three injections (corresponding to FIG. 2*b*). (1) indicates cases where a single early-stage injection (strictly speaking, this was not an early-stage injection; however, this is referred to here as an early-stage injection for convenience) was performed at the same timing as a conventional pilot injection. In the respective curves (1) through (4), the main injection timing is retarded as the curve advances toward the left side.

Figure 3:
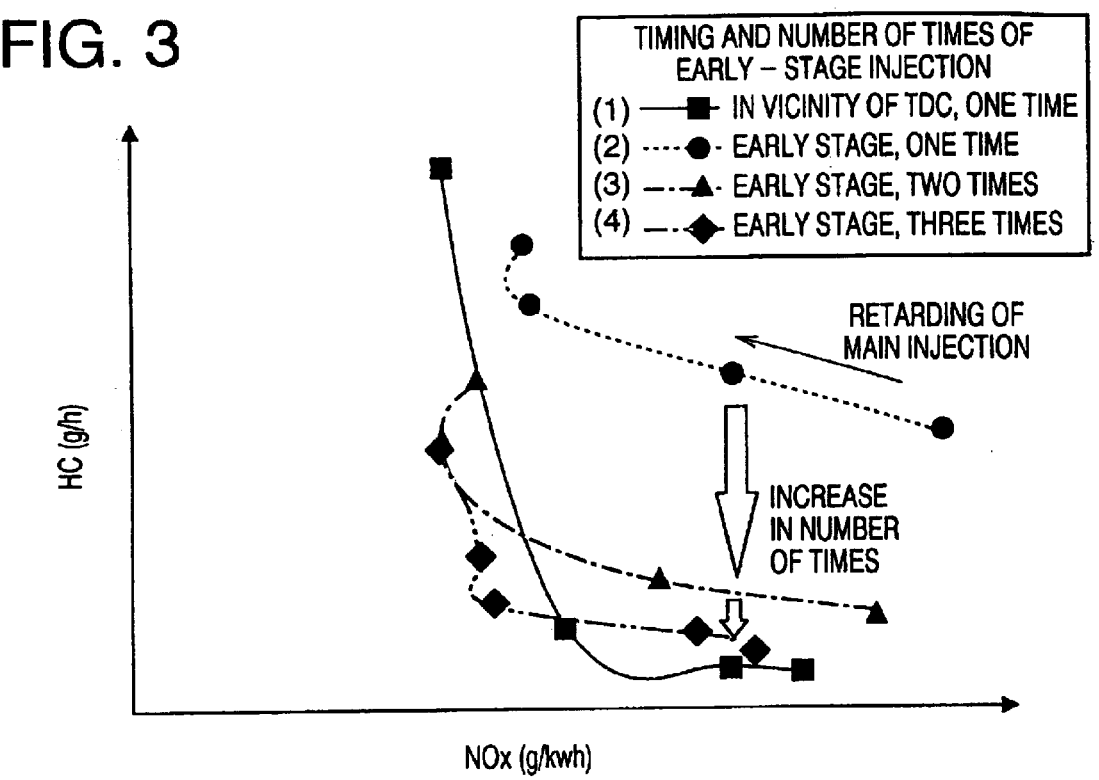
FIG. 3 shows the results of a test investigating the relationship between NOx and HC.
Figure 4:
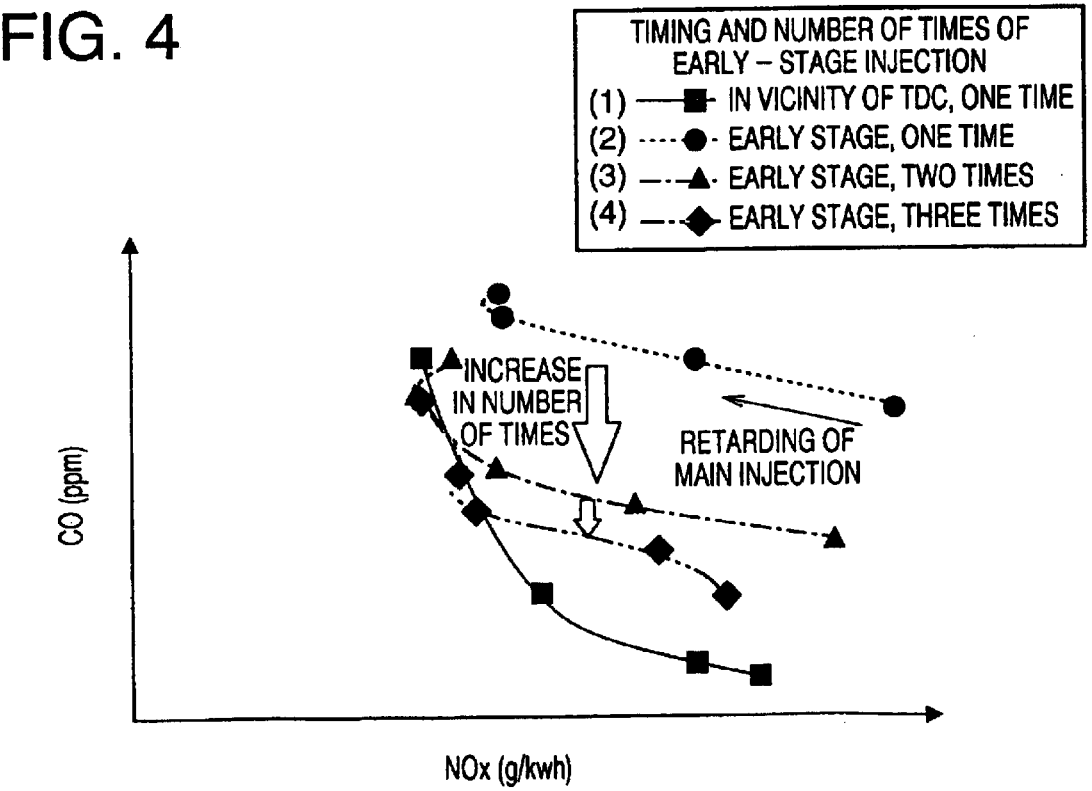
FIG. 4 shows the results of a test investigating the relationship between NOx and CO.
Figure 5:
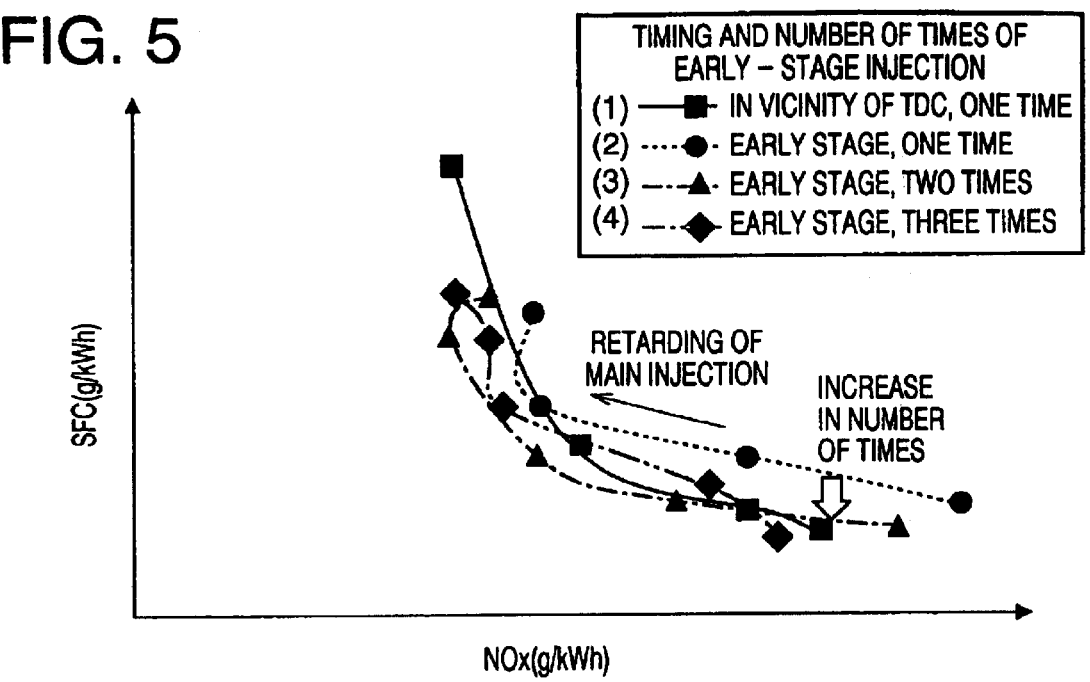
FIG. 5 shows the results of a test investigating the relationship between NOx and fuel consumption.

As is seen from a comparison of curves (1) and (2) in FIGS. 3 through 5, merely altering the injection timing from the ordinary vicinity of TDC to an early-stage timing of 80 to 40° BTDC results in a worsening of the respective performance values for HC, CO and fuel consumption. On the other hand, as is seen from curves (3) and (4), the respective performance values are improved as the number of times that early-stage injection is performed is increased to two times and three times.

Figure 6:
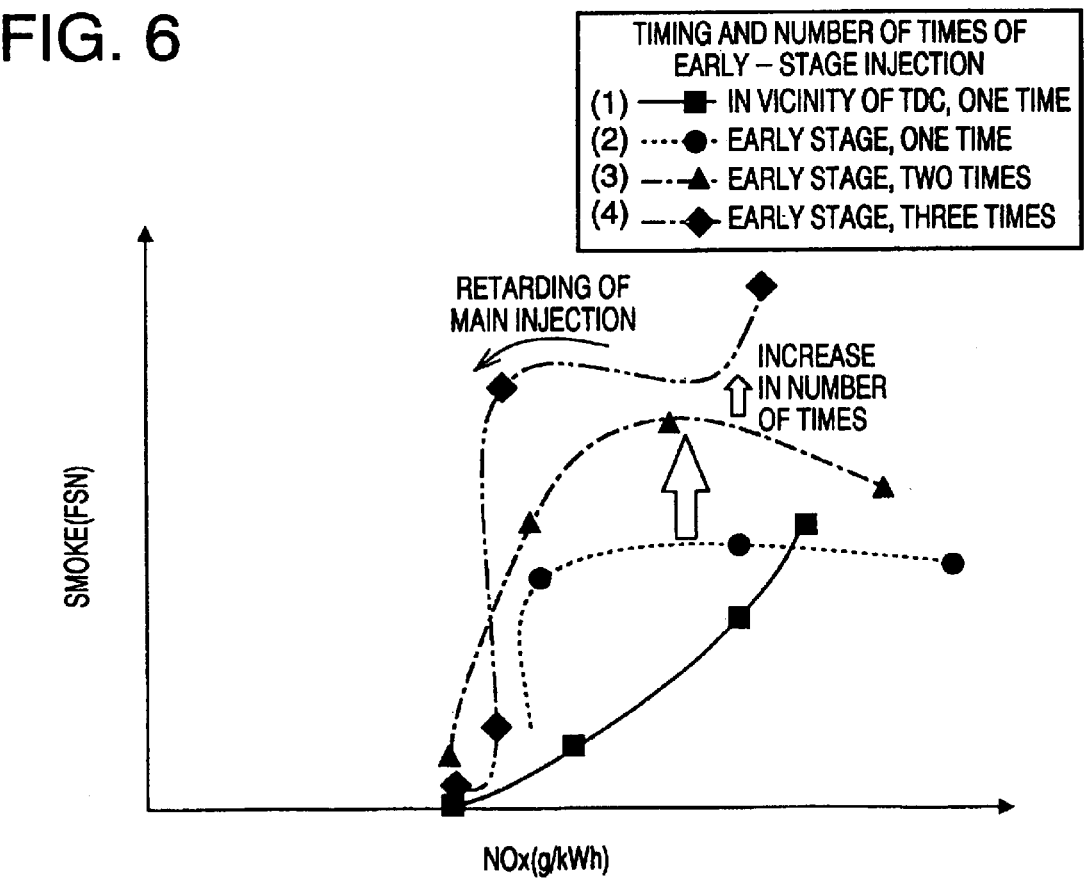
FIG. 6 shows the results of a test investigating the relationship between NOx and smoke.

Meanwhile, as is shown in FIG. 6, an opposite tendency from that described above, i.e., a worsening of smoke, is seen as the early-stage injection timing is advanced, and as the number of injections into which the early-stage injection is divided is increased (curves (2), (3) and (4)), compared to a case in which the early-stage injection is performed one time in the vicinity of TDC (curve (1)). However, if the main injection timing is retarded, a point appears at which the NOx level drops, and at which the smoke is abruptly improved. Accordingly, it is extremely important to elucidate such a point.

Next, FIGS. 7 through 9 shows the results of tests investigating the conditions of heat generation inside the cylinder. In the respective graphs shown in FIGS. 7 through 9, the horizontal axis indicates the crank angle, and the vertical axis indicates the rate of heat generation (ROHR). Furthermore, the values shown for the heat generation rate are values calculated from the actual measured values of the pressure inside the cylinder. FIGS. 7, 8 and 9 respectively indicate cases in which the timing of the early-state injection was early (80 to 40° BTDC), and the number of times that injection was performed was one, two and three times (corresponding to curves (2) through (4) in the graphs shown in FIGS. 3 through 6). The respective curves in the graphs shown in FIGS. 7 through 9 indicate examples in which the early-stage injection timing was equal, and the main injection timing was successively retarded as shown by [1], [2], [3] . . . .

The following discussion is possible from the results shown in FIGS. 7 through 9 and the results shown in FIG. 6.

First, as is clearly indicated by D in FIG. 7, a heat generation peak based on a low-temperature oxidation reaction appears in the range of approximately 30 to 20° BTDC if early-stage injection is performed. However, as is shown by D in FIGS. 8 and 9, the heat generation peak decreases each time that the number of times that early-stage injection is performed is increased. It is thought that this may be attributable to the fact that increasing the number of times of injection causes rarefaction of the mixture due to early-stage fuel injection to progress in the time zone in which the abovementioned low-temperature oxidation reaction occurs, so that this low-temperature oxidation reaction tends not to occur. Instead, since the temperature and pressure inside the cylinder rise as the piston subsequently approaches TDC, the rare mixture ignites, so that a gradual generation of heat appears in the vicinity of TDC, as shown by E in FIGS. 8 and 9. This heat generation peak increases each time that the number of times that early-stage injection is performed is increased.

However, if the main injection is performed while this heat generation is occurring, the fuel Jet mist created by the main injection suddenly enters the hot flame; as a result, there is insufficient mixing of the fuel and air, so that smoke is aggravated. In order to avoid this aggravation of smokes, it would appear that it is desirable for the generation of heat caused by the fuel of the main injection to occur (as indicated by F in FIGS. 8 and 9) after the generation of heat in the vicinity of TDC caused by the early-stage injection indicated by E in FIGS. 8 and 9 has been completed. The heat generation caused by the main injection indicated by F in FIGS. 8 and 9 shows a higher heat generation peak value than the heat generation caused by the main injection indicated by G in the same figures, and this is because it appears that the fuel injected in the main injection participates in combustion without forming smoke. As a result, furthermore, there is a prospect of improvement of the output power and fuel consumption.

The reason that smoke abruptly decreased at a certain point of retardation of the main injection as shown in FIG. 6 is that this main injection was performed at a timing which was such that heat generation of the type indicated by F in FIG. 9 was caused to occur. In other words, such main injection timing is the timing or retardation point that causes an abrupt decrease in the smoke shown in FIG. 6. What should be noted here is that the time of heat generation also depends on the amount of fuel injection.

Accordingly, these facts may be summarized as follows: First, in regard to the early-stage injection, it is desirable to set a fuel injection timing and a fuel injection amount which are such that heat generation is caused to occur in the vicinity of TDC, and in terms of control, it is desirable to control the fuel injection timing and fuel injection amount in accordance with an early-stage injection map that determines such a target fuel injection timing and target fuel injection amount. In regard to the timing, there is the example of 80 to 40° BTDC described above.

Furthermore, in regard to the main injection, it is desirable to set the fuel injection timing and fuel injection amount such that the heat generation caused by the main injection is caused to occur after the heat generation in the vicinity of TDC caused by the early-stage injection has been completed, and in terms of control, it is desirable to control the fuel injection timing and fuel injection amount in accordance with a main injection map that determines such a target fuel injection timing and target fuel injection amount. In regard to the timing, this timing is after TDC in almost all cases.

As a result, an effect that reduces HC, CO and fuel consumption by dividing the early-stage injection into a plurality of injections, and an effect that ameliorates smoke by appropriately retarding the main injection, are simultaneously obtained.

Here, in regard to the early-stage injection, a timing of 80 to 40° BTDC was cited as a typical example. However, the timing of the early-stage injection is not necessarily limited to this timing. In short, it is sufficient if the fuel injection timing and fuel injection amount are such that there is almost no generation of heat based on an oxidation reaction at approximately 30 to 20° BTDC, and are such that heat generation occurs in the vicinity of TDC.

Here, in actual fuel injection, fuel is injected from the jet ports of the injector after a specified lag time has elapsed following the time at which the injector is switched "on". Accordingly, the timing at which the "on" state of the injector is initiated for the purpose of the main injection can be set at a point in time following the completion of the heat generation caused by the early-stage injection in the vicinity of TDC.

Furthermore, the problems described in the section titled "Problems to Be Solved by the Invention", i.e., the problems encountered in cases where a single early-stage injection and a main injection such as those shown in FIG. 2a are performed, may be described in a supplementary manner as follows with reference to FIG. 7. Specifically, as a result of a single early-stage injection, heat generation based on a low-temperature oxidation reaction of the fuel such as that indicated by D in FIG. 7 occurs, so that the temperature inside the cylinder rises during the period preceding TDC. If the main injection is performed in the vicinity of TDC in such a state in which the temperature inside the cylinder is high, the fuel injected in the main injection will be burned all at once, so that NOx is aggravated. If the main injection timing is retarded in order to avoid NOx, then HC and CO are aggravated.

In the present embodiment, since the early-stage injection is divided into a plurality of injections, heat generation such as that indicated by D in FIG. 7 does not occur, so that the rise in the temperature inside the cylinder during the period preceding TDC is suppressed. Accordingly, even if the main injection is performed in the vicinity of TDC, the fuel injected in the main injection is not burned all at once, so that the generation of NOx is suppressed.

In short, the present invention makes it possible to prevent problems such as the adhesion of the fuel jet mist to the inside walls of the cylinder and the like in cases where pre-mixed combustion is realized using an early-stage injection and a main injection, so that the superior merit of preventing a worsening of exhaust gas and fuel consumption can be obtained.

What is claimed is:

1. A diesel engine comprising:
a fuel injector which injects fuel into a cylinder; and
fuel injection control means for controlling the amount of fuel that is injected from this fuel injector and the timing of this fuel injection;
wherein said fuel injection control means performs an early-stage injection of a relatively small amount of fuel divided into a plurality of injections in the compression stroke, and performs a main injection of a relatively large amount of fuel after a specified period has elapsed following the completion of the early-stage injection, said early-stage injection is performed using a fuel injection amount and fuel injection timing which are such that the generation of heat caused by fuel of said early-stage injection occurs in the vicinity of compression top dead center, and said main injection is performed using a fuel injection amount and fuel injection timing which are such that the generation of heat caused by fuel of said main injection occurs after the generation of heat caused by fuel of said early-stage injection has been completed.

2. The diesel engine according to claim 1, wherein said fuel injection control means performs the initial injection of said early-stage injection at a timing after 80° BTDC and before 40° BTDC.

3. The diesel engine according to claim 1, wherein said injection control means performs said main injection after compression top dead center.

4. The diesel engine according to claim 2, wherein said injection control means performs said main injection after compression top dead center.

5. A fuel injection method for a diesel engine, wherein the early-stage injection of a relative small amount of fuel is performed divided into a plurality of injections during the compression stroke of the engine, a main injection of a relatively large amount of fuel is performed after a specified period has elapsed following the completion of the early-stage injection, said early-stage injection is performed using a fuel injection amount and fuel injection timing which are such that the generation of heat caused by fuel of said early-stage injection occurs in the vicinity of compression top dead center, and said main injection is performed using a fuel injection amount and fuel injection timing which are such that the generation of heat caused by fuel of said main injection occurs after the generation of heat caused by fuel of said early-stage injection has been completed.

* * * * *